United States Patent
Nahamoni et al.

(10) Patent No.: US 10,795,981 B2
(45) Date of Patent: Oct. 6, 2020

(54) ADD-ON MODEM FOR WIRELESS DEVICES AND METHODS USEFUL IN CONJUNCTION THEREWITH

(71) Applicant: ELTA SYSTEMS LTD., Ashdod (IL)

(72) Inventors: Oded Nahamoni, Rishon Lezion (IL); Adi Schwartz, Holon (IL); Gil Koifman, Petach-Tikva (IL); Yaakov Shoshan, Ashkelon (IL)

(73) Assignee: ELTA SYSTEMS LTD., Ashdod (IL)

( * ) Notice: Subject to any disclaimer, the term of this patent is extended or adjusted under 35 U.S.C. 154(b) by 544 days.

(21) Appl. No.: 15/515,207

(22) PCT Filed: Nov. 3, 2015

(86) PCT No.: PCT/IL2015/051064
§ 371 (c)(1),
(2) Date: Mar. 29, 2017

(87) PCT Pub. No.: WO2016/071904
PCT Pub. Date: May 12, 2016

(65) Prior Publication Data
US 2017/0220788 A1    Aug. 3, 2017

(30) Foreign Application Priority Data
Nov. 5, 2014   (IL) .......................................... 235508

(51) Int. Cl.
*G06F 21/34*   (2013.01)
*H04W 12/02*   (2009.01)
(Continued)

(52) U.S. Cl.
CPC ............ *G06F 21/34* (2013.01); *G06F 9/4401* (2013.01); *G06F 9/4411* (2013.01); *G06F 9/541* (2013.01);
(Continued)

(58) Field of Classification Search
CPC ...................................... G06F 21/34
See application file for complete search history.

(56) References Cited

U.S. PATENT DOCUMENTS 6,690,947 B1    2/2004  Tom
7,414,529 B2    8/2008  Boss et al.
(Continued)

FOREIGN PATENT DOCUMENTS

CN    1354959 A    6/2002
CN    101444136 A    5/2009
(Continued)

OTHER PUBLICATIONS

"Data Leak Prevention Software for Small Business Offices," http://www.copynotify.com/CopyNotify.html—Aug. 18, 2013.
(Continued)

*Primary Examiner* — Ankur Jain
(74) *Attorney, Agent, or Firm* — Oliff PLC

(57) ABSTRACT

System for ex post facto upgrading of at least one Legacy personal communication device including a legacy modem and lacking at least one desired wireless communication feature, the system comprising an up-graded communication device including an auxiliary modem physically connected via an ex post facto physical connection to a Legacy personal communication device having at least one legacy wireless output channel which has been neutralized or disabled.

18 Claims, 8 Drawing Sheets

(51) Int. Cl.
| | |
|---|---|
| G06F 13/38 | (2006.01) |
| G06F 9/4401 | (2018.01) |
| G06F 9/54 | (2006.01) |
| G06F 13/10 | (2006.01) |
| G06F 21/12 | (2013.01) |
| G06F 21/57 | (2013.01) |
| G06F 21/85 | (2013.01) |
| H04W 60/06 | (2009.01) |

(52) U.S. Cl.
CPC ......... *G06F 13/102* (2013.01); *G06F 13/382* (2013.01); *G06F 21/123* (2013.01); *G06F 21/572* (2013.01); *G06F 21/85* (2013.01); *H04W 12/02* (2013.01); *H04W 60/06* (2013.01); *G06F 2221/2153* (2013.01)

(56) References Cited

U.S. PATENT DOCUMENTS

| | | | |
|---|---|---|---|
| 8,367,235 | B2 | 2/2013 | Huang |
| 9,560,012 | B1 | 1/2017 | Bonang et al. |
| 2003/0190927 | A1 | 10/2003 | Leong et al. |
| 2004/0203732 | A1* | 10/2004 | Brusilovsky ............ H04L 63/08 455/426.1 |
| 2006/0122902 | A1 | 6/2006 | Petrov et al. |
| 2006/0129848 | A1* | 6/2006 | Paksoy .................. G06F 21/78 713/193 |
| 2007/0235519 | A1 | 10/2007 | Jang et al. |
| 2007/0265034 | A1 | 11/2007 | Kasslin et al. |
| 2009/0069051 | A1* | 3/2009 | Jain .................. G06K 19/07739 455/558 |
| 2009/0181716 | A1 | 7/2009 | Benco et al. |
| 2014/0018125 | A1 | 1/2014 | Shoshan et al. |
| 2014/0082728 | A1 | 3/2014 | Kim et al. |
| 2014/0087788 | A1 | 3/2014 | Filipovic et al. |
| 2016/0173244 | A1* | 6/2016 | Ding .................... H04L 5/0023 370/329 |

FOREIGN PATENT DOCUMENTS

| | | |
|---|---|---|
| WO | 2013/011512 A1 | 1/2013 |
| WO | 2013063285 A1 | 5/2013 |
| WO | 2014/060714 A2 | 4/2014 |
| WO | 2014/188413 A1 | 11/2014 |

OTHER PUBLICATIONS

"Sending AT Commands through USB cable using a C program," social.msdn.microsoft.com/Forums/en-US/f4013d7e-fd55-47c0-be99-b614005b670d/send-at-commands-through-usb-cable-using-a-c-program?forum=vcgeneral—Jun. 6, 2008.

"Thread: Sending command to USB device," ubuntuforums.org/showthread.php?t=1877148—Nov. 7, 2011.

Serge Malenkovich,"Charging Your Smartphone. . . What Can Possibly Go Wrong?," http://blog.kaspersky.com/charging-your-smartphone/—May 6, 2013.

"Send AT commands to USB modem," brunomgalmeida.wordpress.com/2012/04/06/send-at-commands-to-usb-modem/—Jan. 20, 2013.

"Sending AT Command to USB Connected GPRS Modem in C#," http://stackoverflow.com/questions/5937119/sending-at-command-to-a-usb-connected-gprs-modem-in-c-sharp—Dec. 26, 2013.

"Send and read result of an At command to a usb modem in c#," stackoverflow.com/questions/8029166/send-and-read-result-of-an-at-command-to-a-usb-modem-in-c-sharp—Jul. 31, 2013.

Rouse Margaret, "Essential Guide, Guide to enterprise mobile app development and SOA," searchconsumerizaton.techtarget.com/definition/mobile-application-processor—Oct. 29, 2016.

SoldierLink System (SLS), https://tinyurl.com/uudmlk6, Oct. 19, 2014.

Franklin C. Kostenko. Mobile Communications Within the Deepwater Lifelines, https://www.hsdl.org/?view&did=761310 , Dec. 13, 2013.

Army Develops Smart Phone Framework, Applications for Battlefield Operations, https://apps.dtic.mil/dtic/tr/fulltext/u2/a563049.pdf, Dec. 31, 2011.

Fitchard, Kevin. Android in camouflage: How the military can utilize smartphone tech. GIGAOM, Apr. 16, 2012.

Hamblen, Matt. IPADS, Android Tablets and Smartphones Join the Military. Computer World. Mar. 16, 2011.

McInnes, Kyle, First Look at the US Military's Smartphone and Desktop App Store. BlackBerryCool. Apr. 28, 2011.

Montalbano, Elizabeth, Military Deploys Two Smartphone Apps. Information Week. Apr. 27, 2011.

Alex Dixon et al. "Nett Warrior gets new end-user device". The United States Army, https://www.army.mil/article/107811/nett_warrior_gets_new_end_user_device, Jul. 22, 2013.

Robert A. Matthews Jr., "The Restricted Scope of Patent Infringement Remedies Available to "Non-Practicing" Patent Owners"., IP Litigator, Jul. 2009 edition.

IHS Jane's Special Report. "Digital Delights: Commercial Wireless Communications on the Battlefield". International Defence Review, pp. 1-14, http://www.militarysystems-tech.com/files/militarysystems/Janes%20Report%20-%20Commercial%20Wirelessc%20Communications%20on%20the%20battlefield%20-%20C2UK.PDF, Aug. 30, 2011.

Shahar Lily, "Storm Riders: IDF Service Airmen". https://www.ynet.co.il/articles/0,7340,L-4494676,00.html, May 3, 2014.

Elbit Systems / Skylark I-LE UAS on YouTube: https://www.youtube.com/watch?v=AlwATw2k4qY, Mar. 10, 2014.

Tal Inbar, "IDF to Begin Assimilation of C2 System". Israel Defense, https://www.israeldefense.co.il/en/content/idf-begin-assimilation-c2-system, Feb. 21, 2013.

US army standards, "Computers With an Embedded Wireless System Must Have the Radio Removed Before the Computer Is Used to Transfer, Recieve, Store, or Process Classified Information". https://web.archive.org/web/20150615082649/http://stigviewer.com/stig/general_wireless_policy/2012-09-21/finding/V-19813, Jun. 15, 2015.

\* cited by examiner

ADD-ON MODEM FOR WIRELESS DEVICES AND METHODS USEFUL IN CONJUNCTION THEREWITH

FIELD OF THE INVENTION

The present invention relates generally to communications systems and more particularly to wireless communications systems.

BACKGROUND AND SUMMARY

The disclosures of all publications and patent documents mentioned in the specification, and of the publications and patent documents cited therein directly or indirectly, and of specifications of mentioned protocols are hereby incorporated by reference.

A dongle is a small piece of hardware that attaches to computer, TV, or other electronic device, and that, when attached, enables additional functions such as security, copy protection, audio, video, games, data, or other services. The dongle typically attaches via an electrical connector to an external bus of the computer or appliance.

Use of auxiliary hardware to enhance cyber-security is well known. For example, Bank haPoalim provides customers with a minikey and a temporary identification code for initial identification. After installation, the client has an identification code for her or his minikey. The minikey is compatible with a computer having a USB port, an operating system which is Windows XP SP3 or higher, and a browser which is Internet Explorer version 7 or higher. The minikey is operative in association with minikey software which may be downloaded from the bank's website, from the CD or from the installation file on the FIG Online website.

According to the following http link:
searchconsumerization.techtarget.com/definition/mobile-application-processor, tan application processor or "mobile application processor is a system on a chip (SoC) designed to support applications running in a mobile operating system environment. A mobile application processor provides a self-contained operating environment that delivers all system capabilities needed to support a device's applications, including memory management, graphics processing and multimedia decoding. Mobile application processors may be independent from other specialized processors in the same mobile device, such as a phone's baseband (wireless communications) processor.

Some vendors manufacture their own mobile application processors. Other vendors purchase their mobile application processors, using them as original equipment manufacturer (OEM) components. For example, the Qualcomm Snapdragon mobile application processor is contained in many smart phones that use Snapdragon to run the Android operating system and Android applications. In this way, every phone manufacturer need not develop its own mobile application processor (although they can); this approach reduces bill-of-materials (BoM) cost and makes it possible to develop low-cost "smart" consumer electronics. A wide variety of mobile devices contain mobile application processors, including feature phones, smartphones, tablets, eReaders, netbooks, automotive navigation devices and gaming consoles.

Sending AT commands via USB is known, e.g. as described at the following http links:

stackoverflow.com/questions/8029166/send-and-read-result-of-an-at-command-to-a-usb-modem-in-c-sharp
stackoverflow.com/questions/5937119/sending-at-command-to-a-usb-connected-gprs-modem-in-c-sharp
social.msdn.microsoft.com/Forums/en-US/f4013d7e-fd55-47c0-be99-b614005b670d/send-at-commands-through-usb-cable-using-a-c-program?forum=vcgeneral
ubuntuforums.org/showthread.php?t=1877148
brunomgalmeida.wordpress.com/2012/04/06/send-at-commands-to-usb-modem/.

Mobile phones typically employ an Application Processor coupled to two or more Appliances (such as keyboard, display, microphone, speaker, etc.) and to two or more Modems and associated RF Front-ends (for communicating, e.g., in either 3G or 4G cellular standards).

Reference is now made to co-pending Israeli Patent Application No. 207180 "Switched application processor apparatus for cellular devices", published 31 Jan. 2013 and incorporated herein by reference, including to FIGS. 1, 8 therein (FIGS. 1-2, herein) which may be described as per the section in italics hereinbelow:

"Attention is drawn to FIG. 1 illustrating schematically an exemplary prior art mobile telephone system architecture 100. As shown, the system 100 includes the two antennae 101 and 102 and associated modems 103 and 104 (e.g., operating in either 3G or 4G cellular standards or Wifi or Bluetooth or NFC) both coupled to application processor 105, which in turn is coupled to a plurality of appliances. Depending on various criteria, such as the selected appliance by the user and the required communication constraints (say 3G or 4G communication), the application processor 105 communicates to the appropriate modem and the appropriate appliance.

Attention is now drawn to FIG. 2, illustrating prior art implementation architecture and exemplary processing routes. It is shown that the additional application processor (Application Processor 2 208) and the relevant Switches (205 and 210) and Controller 207 are implemented as a separated (removable or permanent) add-on unit 215 to typical cellular device 214. The interfaces between the typical cellular device 214 and the additional switched application processor add-on unit 215 include modems to application processors interface 212 and application processors to appliances interface 213.

Thus, for example, a given processing route (as prescribed by controller 207) includes antenna RF1 and its associated Modem 1 (201 and 203), Application Processor 1 209 and given appliance or appliances (as selected by the user from the possible set of Appliances 211). In accordance with a certain other example, another processing route is prescribed by Controller 207, and it includes antenna RF2 and its associated Modem 2 (202 and 204), Pre-processing Application 206 (e.g., firewall), Application Processor 2 208 and given appliance or appliances (as selected by the user from the possible set of Appliances 211). Other variants are applicable (e.g., including modem 1 203 and AP2 208)."

Certain embodiments seek to neutralize existing wireless output channels of a legacy wireless device e.g smartphone.

Certain embodiments seek to add an external auxiliary modem and application processor (i.e. security processor) to a legacy wireless device via a physical link e.g. USB.

Figure 1:
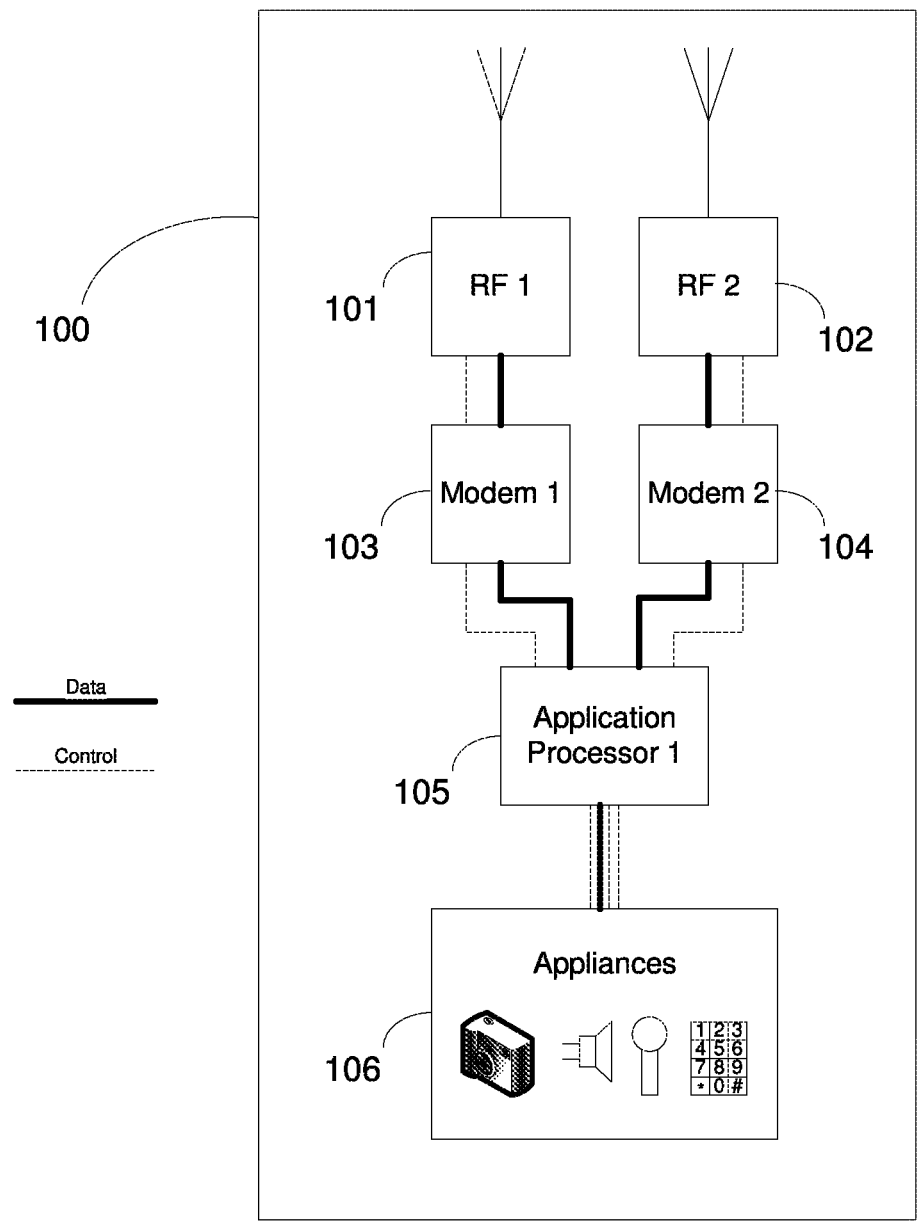
FIG. 1 is a schematic illustration of a typical cellular device system architecture.

Computational components described and illustrated herein can be implemented in various forms, for example, as hardware circuits such as but not limited to custom VLSI circuits or gate arrays or programmable hardware devices such as but not limited to FPGAs, or as software program code stored on at least one intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Data can be stored on one or more intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any time of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION

Fleets of legacy personal (commercial off-the-shelf—COTS) wireless communication devices abound, including but not limited to fleets of one or more of the following: smartphones, tablets, cellular telephones. PDAs (personal digital assistants), Netbooks, PDA phones, and other handheld and/or pocket-sized mobile communication devices running mobile operating systems such as but not limited to Android, Blackberry, Apple iOS, Windows based, Symbian based, WebOS, Linux.

It may be desired to enhance security to prevent sensitive data from flowing, from these devices to hackers or to enable higher security applications such as enabling finance bank transactions made using the wireless communication device. One way to do this is by adding a software security layer, however, the disadvantage is that a software security layer is harder to hack and is more secure than the Legacy personal communication devices' software, but like all software, one may assume that it too can be breached and hacked albeit with more difficulty.

Another way to prevent sensitive data from flowing from legacy personal communication devices to hackers is to replace the Legacy personal communication devices (i.e. commercial of the shelf) with customized secure personal communication devices providing security by hardware/firmware (and also optionally software) means. Security is enhanced relative to the previous method of adding a software security layer. However, the disadvantage is the great expense and inconvenience to end-users and their organizations, of totally replacing an existing fleet of Legacy personal communication devices with a completely different and specialized fleet of personal communication devices; both in initial deployment and in becoming disassociated from whichsoever updates may be provided upon occasion to the Legacy personal communication devices.

Figure 1A:
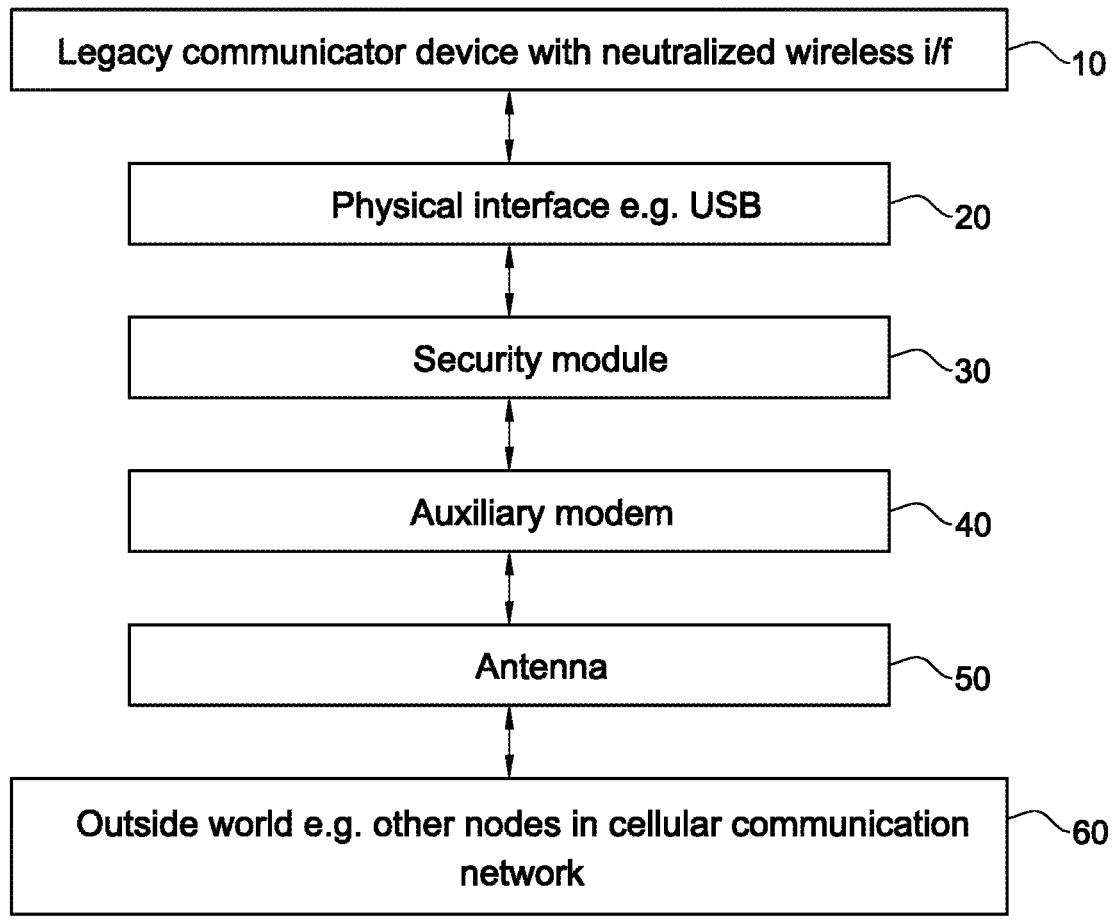
FIG. 1a is a diagram of an embodiment in which an application processor is made to communicate with an auxiliary modem, via a physical interface between the auxiliary modem and a legacy smart phone, such that data from applications provided by the application processor are exported to the auxiliary modem rather than to the legacy smartphone modem.
Figure 1B:
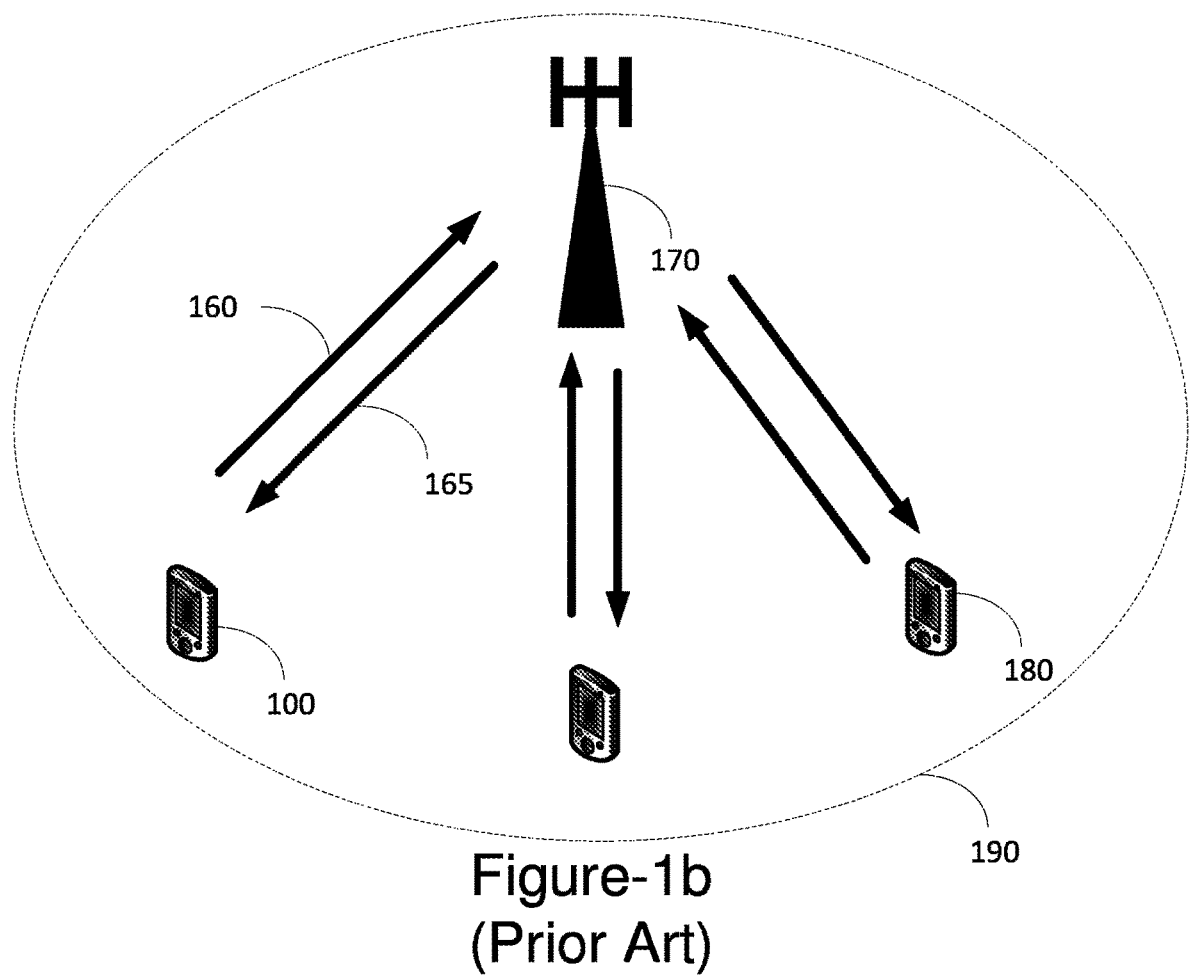
FIG. 1b is a typical cell or other network portion in a wireless e.g. cellular communication system.
Figure 3:
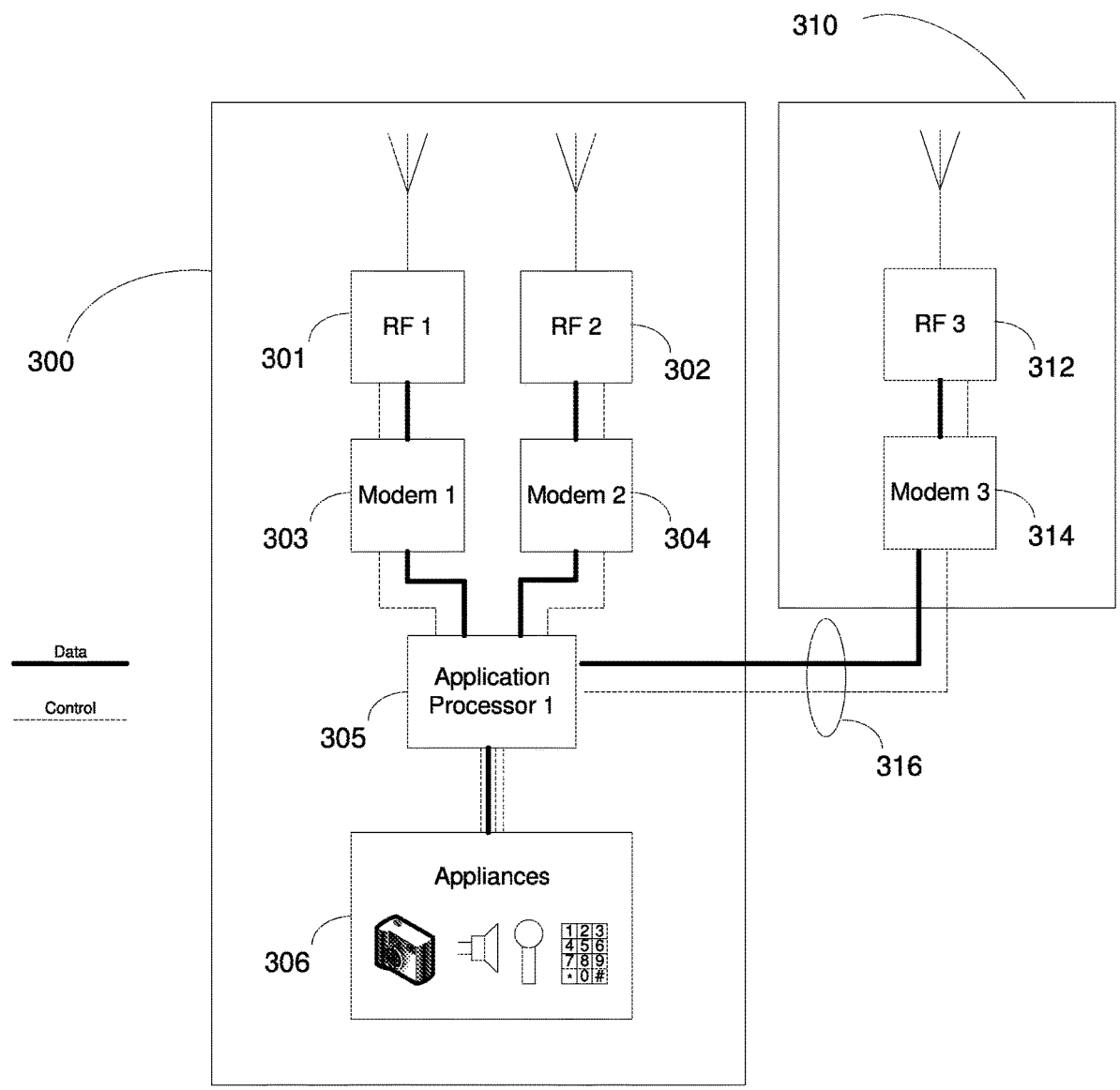
FIG. 3 is a schematic illustration of a typical cellular device system architecture including additional Modem and RF that are implemented as a separated add-on unit.
Figure 4:
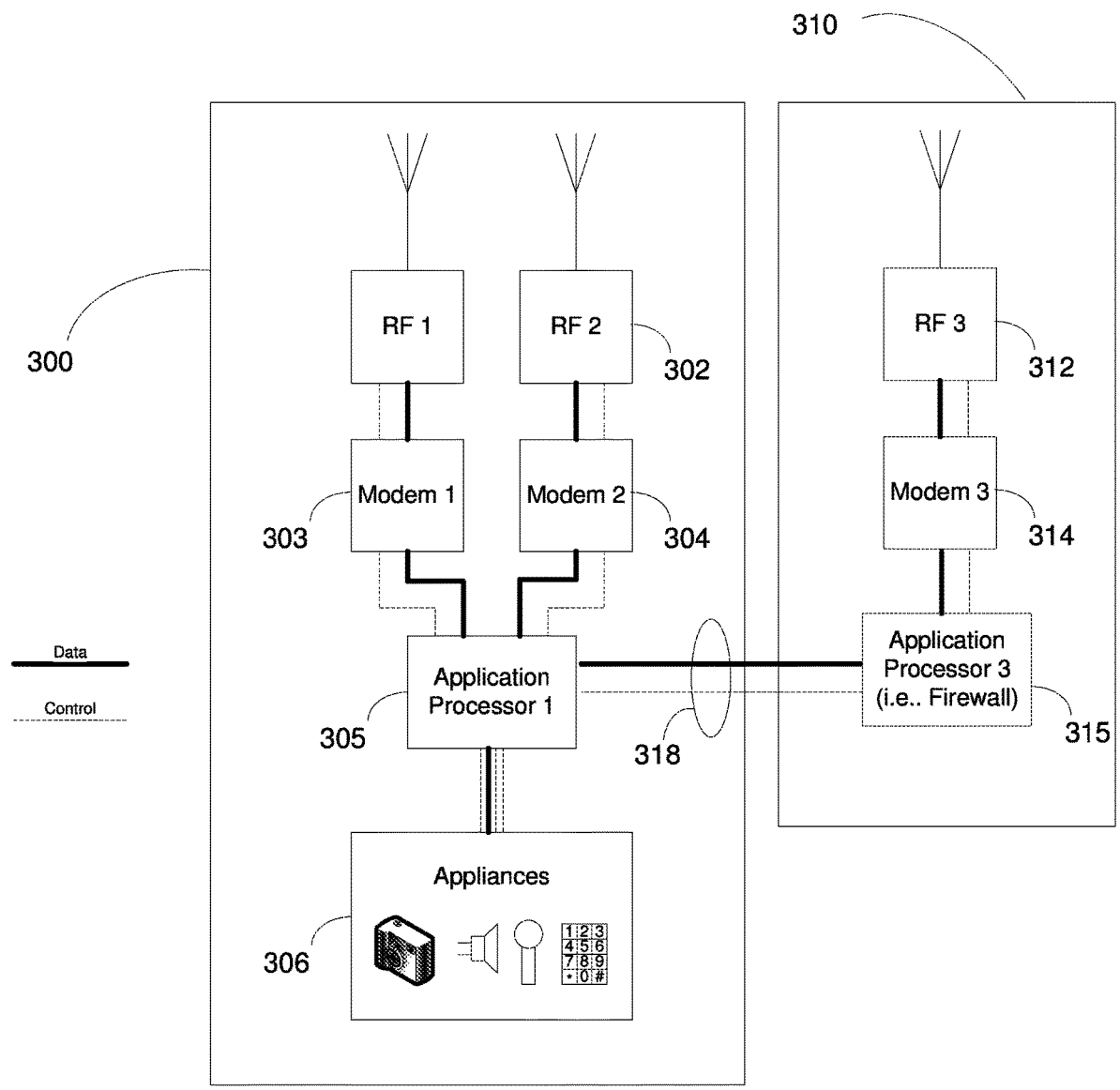
FIG. 4 is a schematic illustration of a typical cellular device system architecture including additional Application processor, Modem and RF that are implemented as a separated add-on unit.
Figure 5:
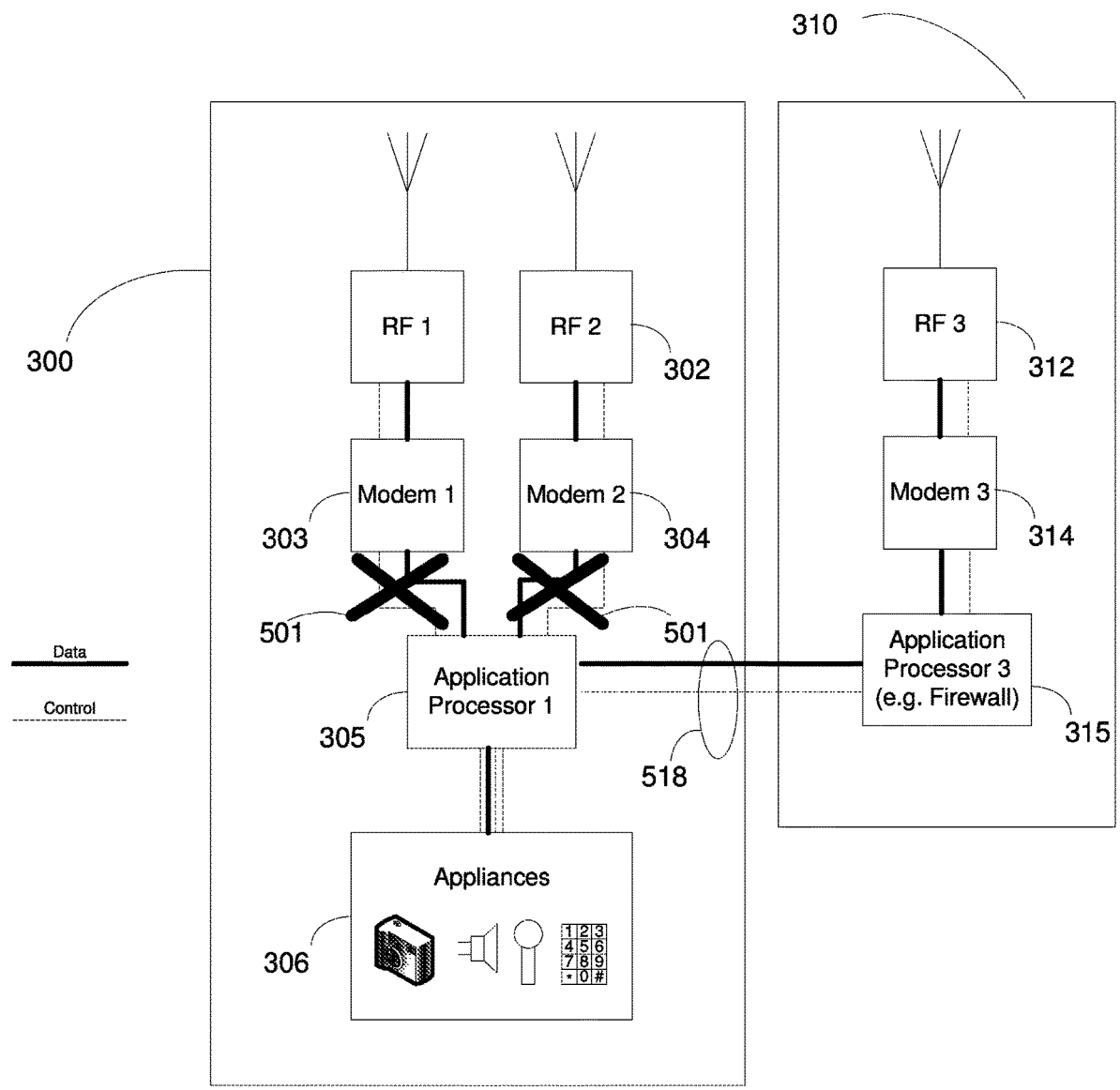
FIG. 5 is a schematic illustration of a typical cellular device system architecture including additional Application processor, Modem and RF that are implemented as a separated add-on unit; and the typical cellular device interfaces between the application processor/s and the wireless modem/s are disabled.

FIG. 1a and FIG. 3, which may be combined, illustrate examples of a system for augmenting a Legacy personal communication device or each member of a fleet of Legacy personal communication devices, with a secure communication device including an auxiliary modem (e.g. any suitable, conventional e.g. commercially available cellular modem) and associated application processor (i.e. security processor) to enhance security of the auxiliary modem relative to the low level of security enjoyed by the legacy modem of the Legacy personal communication device. The aux modem (and optionally additional security processor) may be physically connected to the Legacy personal communication device e.g. via the USB connector (i.e. mini-USB, micro-USB, etc.) thereof. The secure communication device may for example be configured as a jacket or envelope, whose interior has dimensions which match the external dimensions of the (COTS) Legacy personal communication device, such that the Legacy personal communication device may easily be slipped into the secure communication device. The secure communication device may also incorporate, aside from electronics as described herein, conventional physical protection elements to protect the Legacy personal communication device from breakage e.g. if dropped or otherwise subjected to physical force. Alternatively, the secure communication device may be configured, say, to adhere to the back of, or wrap around and be fastened to (even via Velcro), the Legacy personal communication device. Optionally the secure communication device may also include additional battery and/or additional antenna (i.e. enhanced antenna) and/or enhanced RF part for the modem route (i.e. higher output power for the power amplifier).

In addition to provision of the auxiliary modem and associated security module, some or all of the wireless output channels (cellular modem, Bluetooth, wifi) of the Legacy personal communication devices are neutralized such that, typically, the only pathway for wirelessly extracting possibly sensitive data from the Legacy personal communication device is via the secure communication device physically connected thereto. Any suitable method (e using hardware and/or operating system and/or kernel) may be employed to neutralize these. Known solutions, e.g. for disabling smart phone cameras, are described in: SARTANI, Ram and SIMANOVSKI, Anatoly, Israel Published Patent Application IL2012/050257, published Jan. 24, 2013; in U.S. Pat. No. 7,414,529 (Boss et al.); and Published US Patent application No. 2009/0181716 (Benco et al.).

The security module may comprise:

a. a conventional cryptographic security sub-module operative to secure the output channel of the auxiliary modem cryptographically, using a suitable protocol such as (for commercial applications) AES (Advanced Encryption Standard); and/or b. a data security sub-module operative to secure the USB channel of the Legacy personal communication device and/or of the customized secure personal communication device, using conventional data security or cyber-defense technology such as commercial level data security or cyber-defense technology. For example, a "gatekeeper" may be provided to determine whether one who seeks to download from the smart phone via the USB connection, is or is not authorized. Known data security solutions for protecting the USB output channel of a smart phone include:

i. "Data leakage. When charging a smartphone from a PC, or connecting it to a USB port in a car or plane, we rarely consider the possibility that information may be exchanged, as well as power . . . the connected PC can upload all the relevant files from the smartphone. This is especially annoying if you store confidential photos on your smartphone. This behavior is more frequent than it might seem—the automatic upload of photos is a standard setting of many photo album managers, Dropbox and similar applications. If the smartphone automatically connects when it is in removable media mode (UMS, Mass storage), that makes all files in the internal storage accessible to the PC. These may include documents as well as various data backup copies created by applications and many other things. The easiest, and usually quite effective, way to avoid these problems is to switch off the smartphone completely before charging it and keeping it switched off until the procedure is completed . . . . If you need to stay connected, you will have to study the settings of your smartphone carefully. If, when connected to a PC or entering the settings sub-section you are invited to choose a mode to connect with a PC, the best default option would be to choose "Only charge," selecting other temporary modes manually as required. With some smartphones you can enable a protection code, which needs to be entered to establish a connection to the PC. For some Android smartphones additional applications are available that can implement the protection alternatives described above." See the following link: blog.kaspersky.com/charging-your-smartphone/ ii. CopyNotify! Software which "restricts the unauthorized copying of corporate data via USB Drives"; see the following link: copynotify.com/CopyNotify.html According to certain embodiments, the secure communication device's auxiliary modem supports communication in frequency bands assigned, typically by governmental authorities, to special users such as emergency service providers (firefighters, police, triage medical services etc.) thereby to provide this "special frequency band" feature ex post facto to Legacy personal communication devices whose modem supports communication only in frequency bands assigned to the general public.

According to certain embodiments, such as but not limited to the embodiment of FIG. 1a, the application processor is made to communicate with the auxiliary modem, via the physical interface (e.g. usb connection) between the auxiliary modem and the legacy smart phone, such that suitable data from the applications provided by the application processor, are exported to the auxiliary modem rather than to the legacy smartphone modem. Typically, the application processor chip's legs communicate physically via the USB or other physical connection, with the auxiliary modem (also termed herein "virtual modem").

Typically, apparatus operative to maintain latency is provided.

As is well known, the Hayes command set is a protocol or language providing commands e.g. so-called AT commands, for communication between a processor and modem; these commands can subdivide into four groups: basic command set—extended command set—proprietary command set—and register commands. The solution may allow "at" commands to be conveyed from the auxiliary modem to and from a legacy smart phone, via USB protocol e.g. Provision of an AT command proxy, on the application processor. The AT command proxy typically communicates with the secure communication device's security module, if provided, The AT command proxy may be designed to be treated the same, by the application processor, as any other application would be treated, but in fact serves as a bridge between the application processor and the auxiliary modem. Some or all of the teachings of the following known technologies for sending AT commands via USB, mutatis mutandis, may be employed herein:

stackoverflow.com/questions/8029166/send-and-read-result-of-an-at-command-to-a-usb-modem-in-c-sharp stackoverflow.com/questions/5937119/sending-at-command-to-a-usb-connected-gprs-modem-in-c-sharp social.msdn.microsoft.com/Forums/en-US/f4013d7e-fd55-47c0-be99-b614005b670d/send-at-commands-through-usb-cable-using-a-c-program?forum=vcgeneral ubuntuforums.org/showthread.php?t=1877148 brunomgalmeida.wordpress.com/2012/04/06/send-at-commands-to-usb-modem/

A particular advantage of providing a secure communication system which augments a Legacy personal communication device, as described herein, is that r & d and deployment costs for many elements of the Legacy personal communication device, such as but not limited to the screen MMI (man-machine interface), applications, etc. are obviated.

It is appreciated that certain embodiments of the invention have significant and far-reaching applications such as but not limited to:

a. enhancing various security-related features of the legacy smart phone such as cyber defense or data security functions and/or cyber functions and/or interference coping functions.

b. adding new-generation functionality to previous-generation legacy smart phones (e.g. adding 4th generation functionality to a fleet of 3rd-generation phones)

c. converting a fleet of legacy smart phones capable of communicating only in frequency bands available to the public, into a fleet capable of communicating only or also in emergency-frequency-band, and vice versa.

d. Conventionally, an application processor chip in smart phone communicates physically, via its "legs", with the legacy modem in legacy smart phone; a conventional software layer in legacy smart phones supports the conununication between the application processor and the legs connected to the legacy modem.

Figure 2:
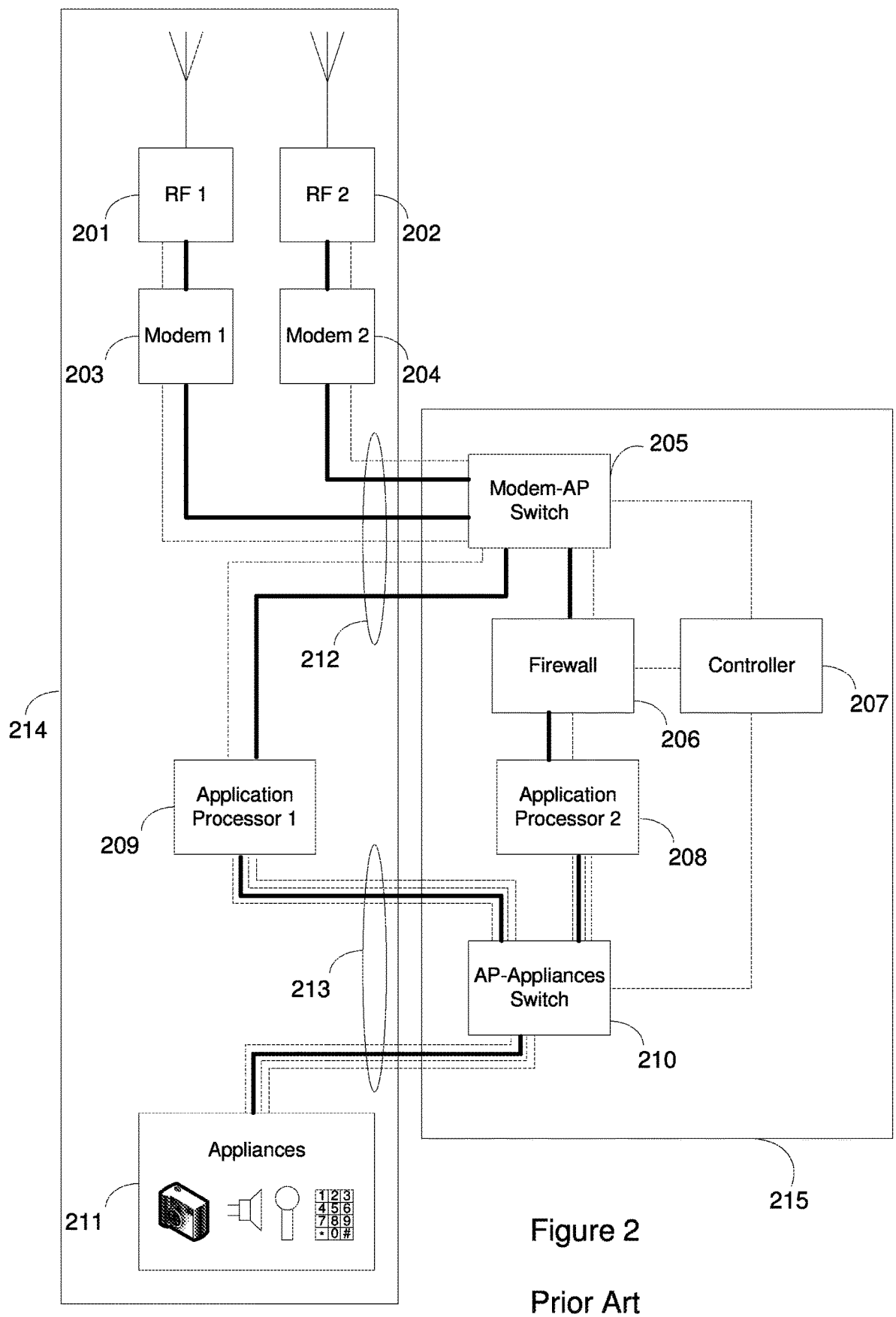
FIG. 2 is a schematic illustration of a typical cellular device system architecture including additional application processor/s, Switches and Controller that are implemented as a separated add-on unit.
Figure 6:
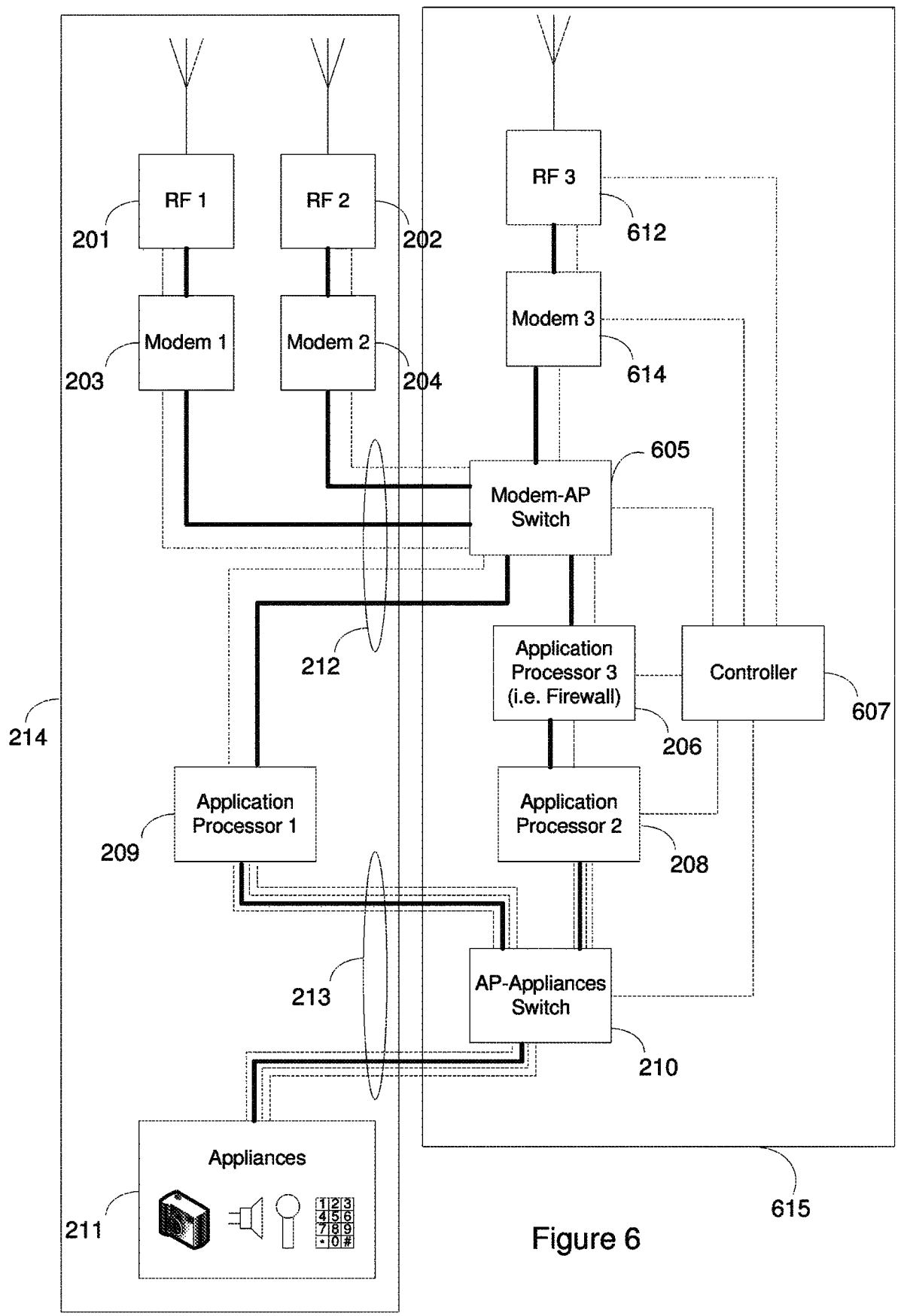
FIG. 6 is a schematic illustration of a cellular device system architecture which is a modification of the system of FIG. 2 including a third RF-modem "branch" connected to the modem—AP switch.

FIG. 6 is a schematic illustration of a cellular device system architecture which is a modification of the system of FIG. 2 including a third RF-modem "branch" connected to the modem—AP switch.

An Add-on Apparatus for Synchronization of Frequency Diversity Communications and Methods Useful In Conjunction Therewith are described in detail, in copending PCT application PCT/IL2014/050437 , published as WO/2014/188413 on 27 Nov. 2014.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or chimes for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution may include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system computer-readable medium, apparatus, including only those functionalities performed at that server or client or node.

Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. A system for ex post facto upgrading of at least one legacy personal communication device including a legacy modem and lacking at least one desired wireless communication feature, the system comprising:
an upgraded communication device including an auxiliary cellular modem, e.g. a commercially available cellular modem physically connected via an ex post facto physical connection to a legacy personal communication device having at least one legacy wireless output channel which has been neutralized.

2. A system according to claim 1,
wherein the legacy personal communication device has a USB port and wherein said auxiliary modem's ex post facto physical connection to the legacy personal communication device is via the USB port.

3. A system according to claim 1,
wherein said upgraded communication device also includes a security module, disposed intermediate said ex post facto physical connection and said auxiliary modem, which provides at least one desired cellular communication security feature lacking in the legacy personal communication device.

4. A system according to claim 3,
wherein said at least one desired cellular communication security feature lacking in said legacy personal communication device comprises cryptographic protection for data wirelessly exiting the legacy personal communication device, and
wherein said cryptographic protection is provided by providing encrypting functionality in said security module.

5. A system according to claim 3,
wherein said at least one desired cellular communication security feature lacking in said legacy personal communication device comprises data security protection for data exiting the legacy personal communication device via a USB port, and
wherein said data security protection is provided by providing cyber defense functionality in said security module.

6. A system according to claim 3,
wherein said at least one desired cellular communication security feature lacking in said legacy personal communication device comprises ability to cope with interference, and
wherein said ability is provided by providing interference coping functionality in said security module.

7. A system according to claim 1,
wherein said at least one desired wireless feature comprises at least one next-generation cellular communication feature lacking in said legacy personal communication device.

8. A system according to claim 7,
wherein said legacy personal communication device is a 3rd generation device, and
wherein said at least one desired cellular communication feature comprises at least one 4th-generation feature.

9. A system according to claim 1,
wherein the legacy personal communication device includes a modem which supports communication only in a first legacy frequency band, and
wherein the auxiliary modem supports cellular communication in at least a second frequency band differing from said first frequency band, thereby to provide to the legacy personal communication device, ex post facto, capability of communicating in a frequency band other than the sole legacy frequency band supported by the legacy personal communication device.

10. A system according to claim 1,
wherein the legacy personal communication device further comprises an application processor chip which communicates physically, via its legs and supported by a legacy software layer, with the legacy modem, and
wherein said auxiliary modem also communicates physically with said application processor chip.

11. A system according to claim 10,
wherein the application processor chip provides applications, and
wherein said upgraded communication device causes the application processor chip to communicate with the auxiliary modem, via said ex post facto physical connection, including causing suitable data from said applications provided by the application processor chip, to be exported to the auxiliary modem rather than to the legacy modem.

12. A system according to claim 10,
wherein the application processor chip provides applications, and
wherein said upgraded communication device causes the application processor chip to communicate with the auxiliary modem, via said ex post facto physical connection, including causing suitable data from the applications provided by the application processor, to be exported to the auxiliary modem rather than to the legacy modem.

13. A system according to claim 1,
wherein said legacy personal communication device comprises at least one of: feature phones, smartphones, tablets, eReaders, netbooks, automotive navigation devices and gaming consoles.

14. A system according to claim 1,
wherein said auxiliary modem communicates in at least 3rd generation cellular standards.

15. A system according to claim 1,
wherein and all of the wireless output channels of the legacy personal communication device are neutralized, such that the only pathway for wirelessly exporting data from the legacy personal communication device is via the auxiliary modem.

16. A system according to claim 1,
wherein the upgraded communication device is configured as a jacket.

17. A method for ex post facto upgrading of at least one legacy personal communication device including a legacy modem and lacking at least one desired wireless communication feature, the method comprising:
providing an upgraded communication device including providing an auxiliary cellular modem, e.g. a commercially available cellular modem physically connected via an ex post facto physical connection to a legacy personal communication device having at least one legacy wireless output channel which has been neutralized.

18. A method according to claim 17, wherein the output channel of the legacy personal communication device is neutralized using at least one of: hardware, operating system, kernel, software.

\* \* \* \* \*